US008818129B2

(12) United States Patent  (10) Patent No.: US 8,818,129 B2
Diggins  (45) Date of Patent: Aug. 26, 2014

(54) DETECTING IMAGE IMPAIRMENTS IN AN INTERPOLATED IMAGE

(71) Applicant: Imagination Technologies Limited, Kings Langley (GB)

(72) Inventor: Jonathan Diggins, Chesham (GB)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 171 days.

(21) Appl. No.: 13/626,827

(22) Filed: Sep. 25, 2012

(65) Prior Publication Data

US 2013/0114906 A1  May 9, 2013

(30) Foreign Application Priority Data

Oct. 4, 2011  (GB) .................................. 1117191.5

(51) Int. Cl.
*G06K 9/40* (2006.01)
*G06K 9/36* (2006.01)
*G06K 9/62* (2006.01)
*G06T 7/00* (2006.01)

(52) U.S. Cl.
CPC ..... *G06K 9/6202* (2013.01); *G06T 2207/20056* (2013.01); *G06T 7/0002* (2013.01); *G06T 2207/20021* (2013.01); *G06T 2207/30168* (2013.01); *G06T 2207/10016* (2013.01)
USPC ............................ 382/275; 382/280; 382/284

(58) Field of Classification Search
None
See application file for complete search history.

(56) References Cited

U.S. PATENT DOCUMENTS

| 4,890,160 | A | 12/1989 | Thomas |
| 2007/0236601 | A1 | 10/2007 | Hahn et al. |
| 2008/0144959 | A1* | 6/2008 | Rasch et al. ................... 382/260 |
| 2008/0317129 | A1* | 12/2008 | Lertrattanapanich et al. .......... 375/240.16 |
| 2010/0265370 | A1* | 10/2010 | Kumar et al. ................. 348/280 |
| 2011/0205369 | A1 | 8/2011 | Knee |
| 2014/0077989 | A1* | 3/2014 | Healy et al. .................. 342/25 F |

FOREIGN PATENT DOCUMENTS

| GB | 2477956 | * | 8/2011 | ................ G06T 7/00 |
| GB | 2477956 | A | 8/2011 | |
| WO | 2004039024 | A | 5/2004 | |
| WO | 2004039074 | | 5/2004 | |

OTHER PUBLICATIONS

Berger et al, A ghosting artifact detector for interpolated image quality assessment, 2010, Consumer Electronics (ISCE), 2010 IEEE 14th International Symposium on, pp. 1-14.*

(Continued)

*Primary Examiner* — Bhavesh Mehta
*Assistant Examiner* — David F Dunphy
(74) *Attorney, Agent, or Firm* — Michael S. Garrabrants (57) ABSTRACT

Some aspects include a method and apparatus for detecting image impairments caused by interpolation in an output image interpolated from two or more input images. The method comprises applying a substantially shift invariant transform to the interpolated image and to at least one of the input or adjacent images to derive a transformed image representation for each image. The transformed image representations of the interpolated image and the at least one adjacent image are then compared and differences between the transformed image representations indicative of image impairments in the output image caused by interpolation are determined based on the results of the comparison.

25 Claims, 6 Drawing Sheets

(56) References Cited

OTHER PUBLICATIONS

Chen et al, An FFT-Based Visual Quality Metric Robust to Spatial Shift, 2012, The 11th International Conference on Information Sciences, Signal Processing and their Applications: Main Tracks, pp. 372-376.*

A. Chetouani et al. "A new reference-free image quality index for blur estimation in the frequency domain" published 2009 IEEE International Symposium on Signal Processing and information Technology pp. 155-159.

Combined Search & Exam Report in GB1217697.0, dated Mar. 27, 2013.

K Berger et al. "A ghosting artifact detector for interpolated image quality assessment" published 2010 IEEE 14th international Sumposium on Consumer Electronics, pp. 1-6.

"Digital Video Image Quality and Perceptual Coding", Taylor & Francis, eds. H.R. Wu and K.R Rao, ISBN 0-8247-2777-0, pp. 5-6.

"A Multiresolution Distance Measure for Images", IEEE SP Letters, vol. 5, No. 6, Jun. 1998.

"Blind measurement of blocking artefacts in images," Z. Wang, A. C. Bovik and B. L. Evans, Proc. IEEE Int. Conf. Image Proc., vol. 3, pp. 981-984, Sep. 2000.

"Objective image quality measure derived from digital image power spectra", N.B Nill and B.H.Bouzas, Opt. Eng. 31(4), 813-825 (1992).

C. H. Chou and Y. C. Li, "A perceptually tuned sub band image coder based on the measure of just-noticeable-distortion profile," IEEE Trans. Circuits and Systems for Video Tech., vol. 5, pp. 467-476, Dec. 1995).

Combined Search & Exam report for GB1117191.5, Jan. 31, 2012.

Engelke U et al: "Perceptual-based Quality Metrics for Image and Video Services: A Survey", Next Generation Internet Networks, 3rd Eurographics Conference on IEEE (May 1, 2007), pp. 190-197, XP 031176445, DOI: 10.1109/NGI.2007.371215 ISBN: 78-1-4244-0856-6.

Extended EP Search Report in EP12187133.9 (Dec. 21, 2012).

Guangyi Chen et al: "An FFT-based visual quality metric robust to spatial shift", Information Science, Signal Processing and Their Applications (ISSPA), 2012 11th International Conference on, IEEE, Jul. 2, 2012 pp. 372-376, XP032241675, DOI: 10.1109/ISSPA.2012.6310578 ISBN: 978-1-4673-0381-1.

Kai-Chieh Yang et al: "A New Objective Quality Metric for Frame Interpolation Used in Video Compression", IEEE Transactions on Broadcasting, IEEE Service Center, Piscataway, NJ, US, vol. 54, No. 3, Sep. 1, 2008, pp. 680-11, XP011343446.

Yonis K et al: "Video Quality Prediction Using a 3D Dual-Tree Complex Wavelet Structural Similarity Index", Jun. 30, 2010, Image and Signal Processing, Springer Berlin Heidelberg, pp. 359-367, XP019144535, ISBN: 978-3-642-13680-1.

Zhou Wang et al "Translation Insensitive Image Similarity in Complex Wavelet Domain", 2005 IEEE International Conference on Acoustics, Speech, and Signal Processing—Mar. 18-23, 2005—Philadelphia, PA, IEEE, vol. 2, Mar. 18, 2005, pp.573-576, ISBN: 978-0-7803-8874-1.

* cited by examiner

DETECTING IMAGE IMPAIRMENTS IN AN INTERPOLATED IMAGE

CROSS REFERENCE TO RELATED APPLICATIONS

This application claims priority from GB application 11171915.5, filed on Oct. 4, 2011, which is incorporated herein in its entirety for all purposes.

BACKGROUND

The following relates to a method and system for identifying image impairments and more specifically to a method and system for identifying image impairments caused by interpolation in an image interpolated from two or more adjacent images thereto.

The process of interpolating between adjacent images in a sequence of images to generate intermediate image representations is a well-established technique, which is commonly used in broadcast standards conversion and frame-rate up-conversion in modern television displays.

There are numerous approaches to the exact method of interpolation, but methods generally fall into two broad categories: motion compensated and non-motion compensated. These categories each have advantages and disadvantages, and entail different trade-offs between the perceived visual quality of the output and the complexity of the interpolation algorithm. Although there are a range of performance characteristics, it is widely appreciated that motion compensated conversion usually offers superior interpolation quality to non-motion compensated conversion.

It is also widely appreciated that both categories of interpolation algorithm can introduce interpolation artefacts such as image distortions that exist in the output sequence that are not present in the input sequence, and these impair the perceived quality of the output.

For example, non-motion compensated conversion commonly entails forming an output image from a weighted combination of the nearest or adjacent input frames, and this leads to 'double imaging' artefacts that are apparent when anything within the image moves. Motion compensated conversion requires a step to estimate the motion vectors between adjacent input frames and then uses these to interpolate moving objects faithfully at the appropriate intermediate position, and any errors in the identification of the correct vectors manifest in incorrect motion portrayal of objects or portions of objects. This can produce visually distracting rips and tears in the output images that impact the perceived quality significantly.

Figure 1:
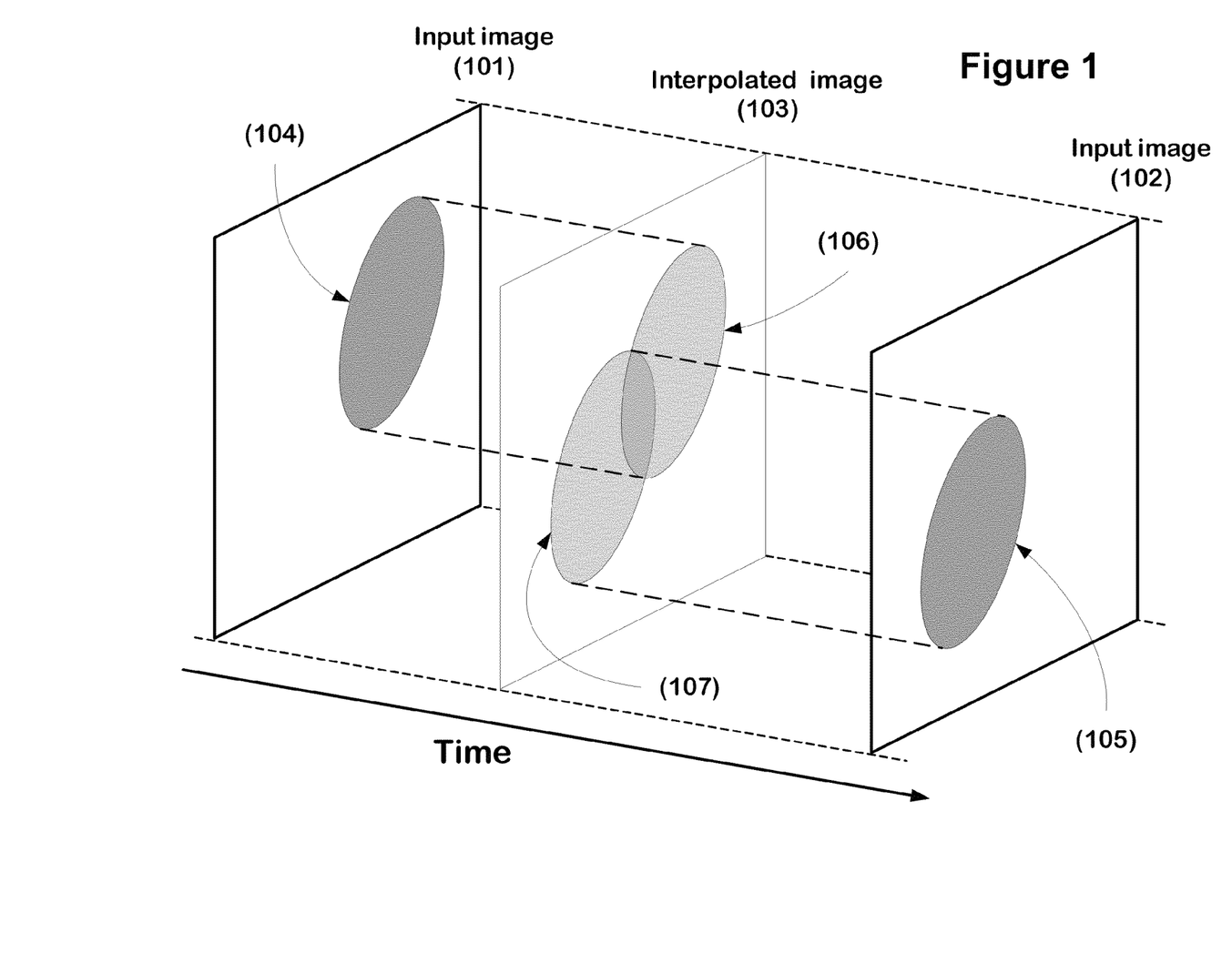
FIG. 1 illustrates temporal interpolation of a moving object by non-motion compensated weighted blending.

FIG. 1 illustrates an example of non-motion compensated interpolation between two temporally sequential input images or frames 101 and 102 to form an output image 103 at some point between the two. The input images contain a moving object, identified at 104 in input image 101 which moves to a new image location 105 in input frame 102. The interpolated output image 103 is formed by a normalised mix of the two input images 101 and 102 where the proportion of the mix is linearly dependent on the temporal distance between the two input images 101 and 102. The representation of input object 104 in the output image 103 is labelled 106 and the representation of input object 105 in the output image 103 is labelled 107. Representations 106 and 107 are misaligned due to the motion of the object, thereby producing two partially superimposed views of the same object, or a 'double image'.

Figure 2:
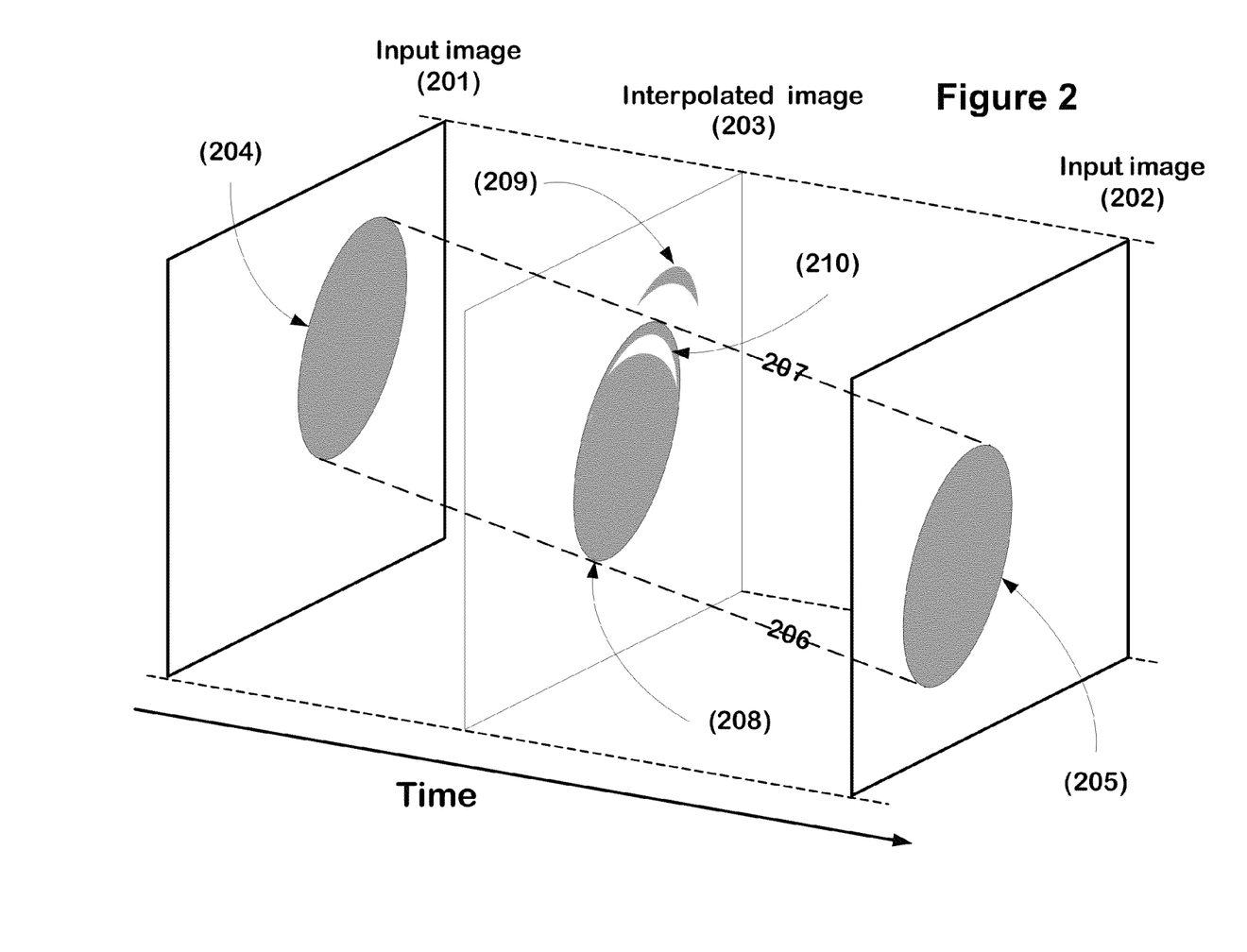
FIG. 2 illustrates temporal interpolation of a moving object by motion compensation, including some vector errors.

FIG. 2 illustrates an example of motion compensated interpolation, between two temporally sequential input images 201 and 202 to form an output image 203 at a point between the two. The aim of motion compensated interpolation is to detect motion between input frames, to form a motion vector field, and then to interpolate objects to an appropriate image position at the desired temporal output point. In the example shown the input images contain a moving object, identified at 204 in input image 201 which moves to a new image location 205 in input frame 202. The desired path of this moving object between input frames 201 and 202 is indicated by the dashed lines 206 and 207. Representation 208 depicts the desired position of the moving object at the intermediate point in time. Motion compensated interpolation is commonly imperfect and errors in the determination of the vectors can lead to errors in the output image produced. Image element 209 indicates an artefact arising when some of the vectors are incorrect, resulting in a portion of the moving object being rendered in the wrong position. Correspondingly, image element 210 indicates an artefact in the object in the output image, due to the missing image element 209.

The appearance of conversion artefacts in images that have been interpolated is clearly undesirable. Although the visual appearance of such impairments is often readily apparent, even to non-experts, it is well known that the identification of such image impairments by automated metrics is a non-trivial problem. Some known quality measurements, for example root mean squared error, can be used if the desired output—a 'ground truth'—exists with which to compare the interpolated output. However, a ground truth often does not exist. Where no coincident reference output or ground truth is available no direct comparison can be made and it is common practice for those skilled in image interpolation techniques simply to manipulate the interpolation algorithm parameters and use human visual observation of the output to minimise the subjective visibility of such artefacts. Clearly, using human visual observation to detect image interpolation impairments or artefacts is time consuming and requires substantial human resources.

Measurement of image quality is in general a well-developed subject area which has a research base extending back over many decades and extensive discussion in the academic literature. There are two principal categories of measurement: 'double-ended' measurements where an impaired image is compared to a corresponding unimpaired image, and 'single ended' measurements which attempt to estimate the degree of impairment from just the impaired image alone. The double-ended category, is further divided into two sub categories: 'full-reference' measurement where the comparison is done between the full-resolution versions of the impaired and unimpaired images, and a 'reduced reference' measurement where a comparison is done between the impaired and unimpaired images, but involves comparing reduced resolution or comparing measured attributes of the images rather than direct comparison of the images themselves. Reduced-reference quality metrics are sometimes used in applications where there is insufficient bandwidth to transfer the entire unimpaired image to the point where the impaired image measurement takes place, but there is sufficient auxiliary or side-channel bandwidth to pass some metadata about the unimpaired image.

Quality measurement techniques can pertain to individual images, or to the comparison of pairs of individual images, or to pairs of corresponding images within two sequences of images—for example comparison of a video source video sequence with the same material after compression encoding and decoding.

Single-ended quality metrics have the advantage that they do not require access to a reference image or image sequence, but they are often specific to certain types of impairment or certain circumstances—such as the measurement of compression blockiness.

Double-ended full-reference and reduced-reference quality metrics have the constraint that some or all image information about the unimpaired source is required at the point where the measurement of the unimpaired image is made, but generally speaking they are broader in scope and more widely adopted.

In the field of image quality assessment, the most commonly encountered metrics are double-ended techniques based on measurements of pixel differences (errors) between impaired and unimpaired pictures. These frequently involve differences in image luminance components, although other components are also used. Examples include; measurement of absolute error, of mean squared error (MSE), the root mean squared error (RMS), and the Peak Signal to Noise Ratio (PSNR) defined by $$PSNR = 10\log_{10}\left\{\frac{255^2}{\frac{1}{N \times M}\sum_{x=0}^{x=N-1}\sum_{y=0}^{y=M-1}(Y_{ref} - Y_{test})^2}\right\}$$

PSNR measurements are used extensively throughout the image processing industry and the academic literature, and form a starting place in virtually all text books on image quality measurement (for example, "Digital Video Image Quality and Perceptual Coding", Taylor & Francis, eds. H. R. Wu and K. R Rao, ISBN 0-8247-2777-0, pp 5-6).

A key feature of PSNR and related image distortion measurements which are based on pixel differences is the requirement for the reference and test images to be aligned, since any misalignment—or any content exhibiting movement between them—results in pixel differences which corrupt the PSNR score and render it meaningless. It becomes impossible to distinguish alignment or motion-related pixel differences from image impairment pixel differences. Thus, these methods are not suitable for detecting interpolation artefacts in an interpolated image where there is motion between the non-interpolated or adjacent images and the interpolated image, and no ground reference exists. In some situations such as compression coding, the processed image can be offset by a fixed amount from the original, and the distortion measurement must be preceded by an image registration step to realign the processed image with the original. Alignment handling in this way, is quite different from the task of dealing with motion differences between test and reference images and in the general case cannot be applied to compare temporally or spatially interpolated images with the original non-interpolated images when motion is present.

A large number of extensions to the basic idea of pixel-differences exist in the prior art, which involve spatial or temporal frequency weighting of errors with a pre-processing step to divide the test and reference images into frequency sub-bands, calculating the error between the separate corresponding sub-bands and then combining the results using different weights. The frequency sub-band weighting is commonly arranged in a manner intended to reflect the sensitivities of the human visual system to specific spatial or temporal frequency features. Examples of this are the 'just-noticeable-distortion' method of Chou and Li (C. H. Chou and Y. C. Li, "A perceptually tuned sub band image coder based on the measure of just-noticeable-distortion profile," IEEE Trans. Circuits and Systems for Video Tech., vol. 5, pp. 467-476, December 1995), and the multi-resolution method of Juffs (Beggs and Deravi Juffs, E. Beggs, F. Deravi, "A Multiresolution Distance Measure for Images", IEEE SP Letters, vol. 5, No. 6, June 1998).

The application of frequency domain techniques in such cases is used as a means to estimate the subjective significance of differences in specific image attributes of test and reference images that are aligned in the sense that there is no content motion between them. The underlying assumption with is that any differences between test and reference images are due to image distortions only, and not to motion between the frames.

It is well known that spatial translation or motion between images manifests as a fixed phase difference between the respective image spectra. This is the basis of the phase correlation motion estimation technique originally applied to television image sequences and disclosed in U.S. Pat. No. 4,890,160. This approach offers an efficient and elegant way to identify motion vector candidates that can be used as part of a frame-rate conversion algorithm. But it does not provide a measure of output picture quality, or indeed indicate where errors have occurred which produce visual impairment in the output.

A technique for estimating image quality from the power spectrum of the image is disclosed by Nill and Bouzas in N. B Nill and B. H. Bouzas, "Objective image quality measure derived from digital image power spectra", Opt. Eng. 31(4), 813-825 (1992). This technique is a single ended technique and based on assumptions of power spectra of "typical" natural video.

Most image compression 'blockiness' or 'blocking-artefact' quality estimation algorithms rely on measuring spatial pixel differences rather than being frequency-domain based. But an algorithm by Wang, Bovik and Evans (Z. Wang, A. C. Bovik and B. L. Evans, "Blind measurement of blocking artefacts in images," Proc. IEEE Int. Conf. Image Proc., vol. 3, pp. 981-984, September 2000) uses a power spectrum approach to detect blockiness. Their method is single-ended and involves measuring absolute energy component differences between the power spectrum, and a median-filtered version of the same power spectrum, at specific harmonic frequencies that are indicative of a periodic distortion across the image—effectively identifying energy peaks at the harmonic frequencies. This relies on the artefact(s) having a periodic structure, which is not the case in commonly encountered interpolation errors.

US 2011/0205369 provides a method and system for detecting image impairments or interpolation errors caused by interpolation in an image interpolated from two or more adjacent images thereto. The method involves deriving a measure of image detail for each of the interpolated or output image and the adjacent or input images, for example by summing the magnitudes of pixel-value differences between horizontally adjacent pixels in the respective images. The image detail measure of the interpolated image is then compared to an interpolation of the image detail measures of the adjacent images which, for example, may be a weighted average of the adjacent image detail measures determined by the temporal phase of the interpolated or output image with respect to the adjacent or input images. They conclude that if an excess in image detail in the interpolated or output image is detected, in comparison to the interpolation of the image detail measures in the adjacent or input images, then this may indicate the presence of interpolation artefacts.

By using a block-based sum of absolute pixel-value differences as the image detail measure, as done in the example in US 2011/0205369, the sensitivity to motion is reduced. That is, the effects of motion within each image are integrated out. However, persons skilled in the art will appreciate that differences due to moving image content entering or leaving the block or blocks, interpolation errors spanning block edges, and occluded or revealed areas due to motion, can each have a detrimental effect upon the reliability of the measurement for detecting changes in detail attributable to interpolation error alone. Because of the influence of these effects, the prior art takes the additional step of interpolating the detail measures to co-time input and output detail measure and lessen the influence of motion-related differences in said detail measures corresponding to adjacent frames, prior to comparison. A further step is also included whereby the variation in detail measure comparisons is evaluated by temporally filtering to isolate specific temporal frequencies that are more likely to be indicative of interpolation errors than motion-related differences. The skilled person will appreciate that the difficulty in distinguishing between motion-related detail differences and image interpolation error-related differences in the method of US 2011/0205369 is borne out by these additional steps described in the preferred embodiment of that patent application.

The applicant has appreciated that it would be desirable to provide a more accurate method for identifying image impairments caused by interpolation errors.

SUMMARY

In one aspect, a computer-implemented method for detecting image impairments caused by interpolation from two or more adjacent images is provided., each image comprising a plurality of pixels. The method provides for: applying a substantially shift invariant transform to the interpolated image and to at least one of the adjacent images to derive a transformed image representation for each image. Each transformed image representation comprising a plurality of values which are substantially independent on the spatial position of the pixels in the image. The method also provides for comparing corresponding ones of the values in the transformed image representations of the interpolated image and at least one of the adjacent image, summing the results of the comparisons and detecting differences between the transformed image representations indicative of image impairments in the interpolated image caused by interpolation from the sum of the results of the comparisons.

The image may be interpolated from temporally adjacent or spatially adjacent images. That is between images sequential in time or between images sequential in space at a given time.

The applicant has appreciated that by applying image transformation operations to each of the interpolated or output and at least one of the adjacent or input images to a domain that exhibits mathematical shift-invariance, and forming a signal comparison between the image representations in the shift-invariant domain. Implementations can provide improved motion-independence in comparison to the prior art, and therefore enable more accurate detection of interpolation image impairments. In some aspects, there is no need to interpolate between input or output signal measurements for temporal alignment purposes, although such an interpolation step is not excluded from all implementations.

In US 2011/0205369 it will be appreciated that motion insensitivity is roughly proportional to image block size. This suggests the use of a reasonably large image block. However, although pixel differences due to interpolation errors such as artefacts are generally large, they only occur for a small percentage of pixels in the block. Furthermore, intrinsic pixel differences in typical video are reciprocal power-law in form, which means that there is a strong bias towards small values. This means that the average of pixel differences is heavily influenced by lots of small values, and typically the larger the image block the larger the bias.

Thus, when the pixel difference values are summed or averaged over the image block to produce the image detail measure in US 2011/0205369, the small percentage of high differences due to artefacts is very "diluted" by the small, intrinsic difference values. In other words, the average is only increased by a small amount when an artefact is present.

Since the adjacent (previous and next) input images have slightly different reciprocal power-law forms, due to motion, some of this difference is still present in the interpolated image detail measure (obtained by interpolating or averaging the image detail measures of the previous and next images). Thus, US 2011/0205369 relies on the assumption that the small, "diluted" shift in the average of the pixel difference values of the interpolated/output image caused by the presence of an artefact is distinguishable from the remaining motion difference in the interpolated image detail value (of the previous and next images).

In comparison, the applicant has appreciated that by transforming the images into substantially shift invariant transformed image representations, each comprising a plurality of values which are substantially independent of the spatial position of the pixels in the respective image, the comparison of the images can be performed without first having to sum or average over the values in the image representations. In some implementations of the disclosure, corresponding ones of the values in each of the transformed image representations are compared. The results of those comparisons are then summed. The sum of the results of the comparisons is then used to detect whether differences are such to indicate image impairment.

Thus, some implementations have the advantage that local differences are not diluted by the rest of the image transformation. This means that implementations of the disclosure can be more sensitive than the method in US 2011/0205369 and therefore can more accurately detect image impairments.

Whilst discrete representations of continuous integral transforms like the Fourier transform may not retain the strictly shift-invariant properties of their continuous counterparts, it is nonetheless well known that the discrete representation of such image transforms—like the Fourier transform magnitude—exhibit a close approximation to shift invariance, particularly when used in combination with a data windowing function, which is very commonly encountered in implementations of such transforms. The skilled person will understand that certain image transform elements or image transformation representations, such as the Fourier transform magnitude—and associated power spectrum—exhibit very good shift-invariance, yet contain a highly descriptive representation of the image in terms of the energies of individual frequencies within in it.

Thus, some implementations of the disclosure have the advantage that image interpolation errors may be detected, without requiring a reference image or ground truth with which to compare the interpolated image which often does not exist. Furthermore, some implementations enable image impairments caused by interpolation to be detected more accurately than known techniques.

One such transformed image representation is the power spectrum of the images. However, the skilled person will appreciate that other integrating transforms which can remove spatial translation dependency variations exist. For example, the family of Complex Wavelet Transforms includes shift-invariant forms such as the Dual Tree Discrete Wavelet Transform (DT-DWT). Additionally, some feature-based transforms such as the Hough Transform also have shift invariant properties. The Hough Transform casts the image into a representation which contains information about the presence of specific features—usually straight lines—within the image, but not the spatial position of the features. Both the above example transforms represent the image in different mathematical terms, but form descriptions that are substantially independent of spatial position and thus not dependent on motion, similarly to the power spectrum. Alternative shift-invariant transforms to the power spectrum may be utilised with the same underlying premise; that the differences between input and interpolated images in the shift-invariant representation can be used to identify interpolation defects in the presence of motion, where differences in the original image domain would otherwise be influenced by the motion.

It is preferable that the comparison be performed between the transformed image representation of the interpolated image and the transformed image representation of each of the adjacent images. However, it has been found to be sufficient for detecting image impairments caused by interpolation if the comparison is performed between the transformed image representation of the interpolated image and the transformed image representation of only one of the adjacent images.

The measurement provided in some implementations is a double-ended measurement in which the appearance of image artefacts in the interpolated output is inferred by comparing frequency domain characteristics of the output image with frequency domain characteristics of the input images between which the interpolated output is generated. The transformed image representations may comprise a logarithmic magnitude of the Fourier transform.

Some implementations do not necessitate that a comparison be performed between co-timed or co-incident frames because it is able to accommodate the inter-frame motion differences of typical moving image sequences in such a way that measurements can be done between an interpolated frame and the nearest adjacent input frames. As will be appreciated by those skilled in image interpolation techniques, this is of significant benefit, and implementations of the disclosure have many applications, including enabling potentially real time correction of interpolation algorithms. For example, it is common in frame-rate interpolation algorithms to employ multiple motion compensated images—such as separate forwards and backwards interpolations—and to form an output from a combination of more than one interpolation mode. By separately measuring the interpolation impairment of such separately interpolated images, according to the disclosure, a choice can be made to favour the projection with the lower impairment score.

In relation to one example implementation, the applicant has appreciated that interpolation errors change the spectral properties of images such that they generally introduce—or suppress—frequency components in two-dimensional spatial power spectra of the interpolated (output) images, which are distinguishable from the frequency components present in the power spectra of the source (input) images either side of the interpolation position. That is, the applicant has appreciated that interpolation errors may introduce or suppress frequency components across the frequency spectrum, including high frequency components and low frequency components.

In some implementations, differences detected between image transformation representations are compared to a threshold to determine whether the differences are indicative of image impairments caused by interpolation errors.

Implementations can output an indication of whether image impairments are present in the image.

As previously mentioned, the power spectra of images in a typical moving image sequence are not strictly static. However, the differences that are introduced by interpolation artefacts are generally much larger than the typical intrinsic differences between successive images in the source sequence due to slight deviations from strict shift-invariance. This characteristic is exploited by some implementations so that image impairments or interpolation artefacts caused by interpolation errors may be identified by comparing power spectra of input and interpolated images, without requiring a reference output or ground truth co-incident with the interpolated image. Furthermore, such implementations may provide for detection and/or identification of different types of interpolation error.

The applicant has appreciated that in general there is a tendency for rip and tear type interpolation artefacts to introduce spectral energy components that do not exist in the original images, thus increasing spectral energy at the specific frequencies that are introduced by the errors. Conversely, there is a tendency for blend type interpolation artefacts to reduce some spectral energy components. These are rules of thumb and dependent upon the precise content of the images. There are counter-examples where blending can increase spectral energy or rip and tear artefacts can reduce it. However, the applicant has appreciated that image ripping and tearing artefacts generally introduce increased spectral energy and blending or double image impairments or artefacts generally introduce reduced spectral energy, and that these properties may be used to aid automatic identification of the different types of image impairment. This may be desirable in many applications. For example, if it is determined that an image contains many rip and tear artefacts, which are generally more noticeable to a viewer than double imaging artefacts, one may decide to switch interpolation techniques and use a non-motion compensated interpolation technique.

Some implementations provide, two separate spectral comparison metrics or derivations that have the advantage that they generally identify separate kinds of impairment. The first metric gives an indication of the level of image ripping and tearing artefacts if any are present, based upon increased spectral energy associated with such impairments. The second metric gives an indication of any blending or double image impairments, based upon reduced spectral energy.

Each of the interpolated image and the adjacent images may be divided into a plurality of blocks each comprising a plurality of pixels, and transformed image representations of spatially corresponding image blocks in the interpolated and non-interpolated or adjacent images may be compared to detect image impairments. This is advantageous as it enables an indication of whether image impairments are present to be determined for each block in the interpolated image and therefore the region of the image in which the image impairments are present to be detected. An indication of the image impairments present in the entire image may also be derived from the measurements of image impairments present in each of the image blocks of the interpolated image. This may be advantageous as it may enable those frames with substantial image impairments, and thus those which are unacceptable to a viewer, to be identified quickly from a series of frames. The indication per block may then be used to identify the incorrect interpolation algorithm if desired.

In an embodiment, the comparing step comprises determining, for each of the values in the transformed image representation of the interpolated image, a ratio of the value in the transformed image representation of the interpolated image to the corresponding value in the transformed image representation of the at least one adjacent image; and summing the ratios.

Each of the values in the transformed image representation of the interpolated image may be compared to an average of the corresponding values in the transformed image representations of the adjacent images.

In an alternative embodiment, the comparing step comprises determining, for each value in the transformed image representation of the interpolated image, a ratio of the sum of the magnitudes of the differences between the value in the transformed image representation of the interpolated image and the corresponding value in each of the transformed image representations of the adjacent images, to the magnitude of the difference between the corresponding values in the transformed image representations of the adjacent images; and summing the ratios.

This method provides a more accurate way of detecting image impairments. By determining the difference between values in the transformed image representations of the adjacent images, any remaining signal is either due to residual motion dependence or due to object occlusion intrinsic in the scene. Comparing this difference with the difference between values in the interpolated and adjacent transformed image representations enables a distinction to be made between what in the interpolated image is due to residual motion/occlusion energy and what is not, and therefore is likely to be due to the presence of an artefact.

Implementations of the disclosure may provide or use a computer program for configuring a computer to perform implementations of the disclosure, as summarized above. Such computer program may be stored on a tangible computer readable medium. Apparatus may also be provided to implement methods according to the disclosure.

Some aspects further provides apparatus for detecting image impairments caused by interpolation in an image interpolated from two or more adjacent images thereto, each image comprising a plurality of pixels, comprising: means for applying a substantially shift invariant image transform to the interpolated image and to at least one of the adjacent images to derive a transformed image representation for each image, each transformed image representation comprising a plurality of values which are substantially independent of the spatial position of the pixels in the image; means for comparing corresponding ones of the values in the transformed image representations of the interpolated image and at least one of the adjacent images; means for summing the results of the comparisons; and means for detecting differences between the transformed image representations indicative of image impairments in the interpolated image caused by interpolation from the sum of the results of the comparisons.

BRIEF DESCRIPTION OF THE DRAWINGS

An example implementation of disclosed aspects will now be described by way of example only and with reference to the accompanying drawings in which.

DETAILED DESCRIPTION

In an example disclosed below, the transformed image representations are power spectrums of the images. However, as explained above, other substantially shift invariant image transformations may be used.

In the example disclosed below, measurements are based upon the luminance component of the images. However, it will be appreciated that the described method could equally be applied to an alternative colour component, to multiple components or in a different colour space representation.

Figure 3:
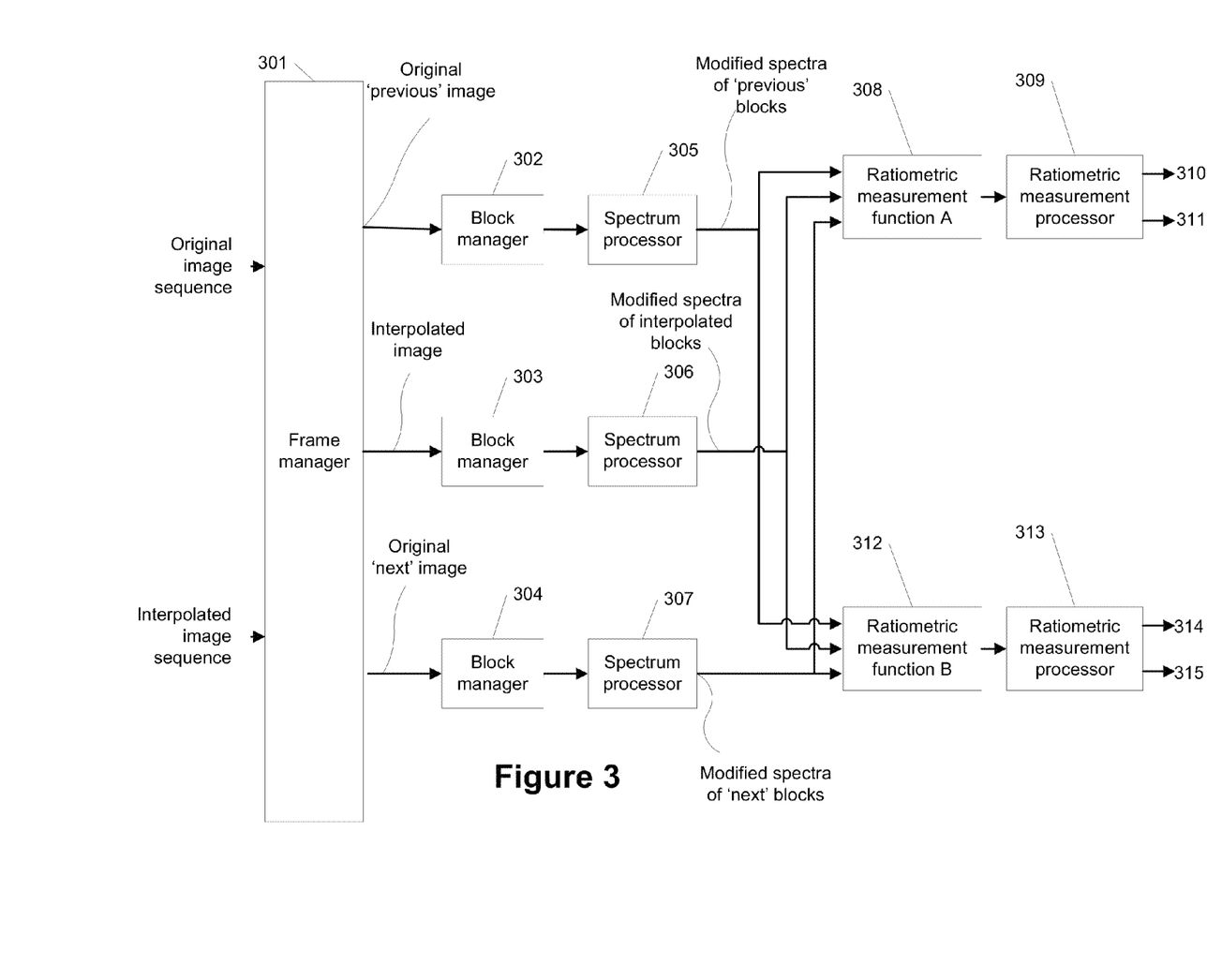
FIG. 3 shows an overall block diagram of an example implementation.

With reference to FIG. 3, first, a frame manager 301 selects images from an original image sequence and an associated interpolated image sequence such that, for each image in the interpolated sequence, the corresponding adjacent original images in the original image sequence before and after the interpolated image ('previous' and 'next') are available for analysis. The previous, interpolated and next images are passed to block managers 302, 303 and 304 respectively, which have identical algorithmic functionality, as now described with reference to FIG. 4.

Figure 4:
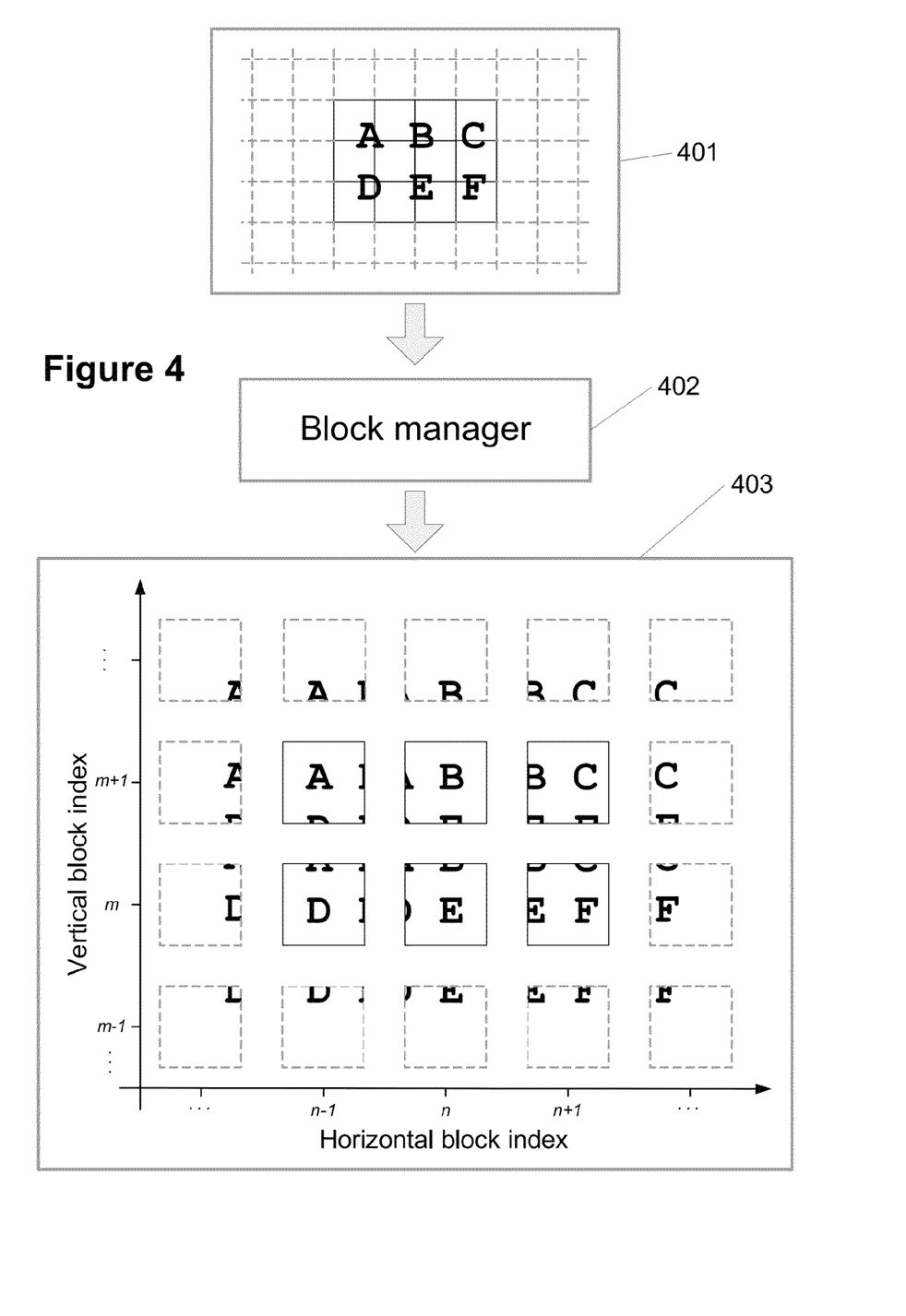
FIG. 4 shows the functional operation of a block manager that can be used in an implementation.

FIG. 4 shows the processing of the block managers 302, 303 and 304. An image 401 is provided to the input of the block manager 402, which separates out or divides the image into overlapping blocks 403 for subsequent processing. Each image block is uniquely identifiable by horizontal and vertical indices n and m which specify the location of the block within the image. For High Definition (HD) 1920×1080 resolution video sequences, a suitable block size is 128×128 overlapping by 64, although alternative choices of block size or overlap, and including rectangular (non-square) blocks may be adopted.

Referring back to FIG. 3, for each block position (n,m), the three block managers 302, 303 and 304 deliverer spatially co-incident image luminance blocks $f_P^{n,m}(x,y)$, $f_I^{n,m}(x,y)$ and $f_N^{n,m}(x,y)$ from previous, interpolated and next images respectively, where x is the relative horizontal position within the block, and y is the relative vertical position within the block. The image luminance blocks are passed to spectrum processors 305, 306 and 307 respectively which are algorithmically identical functions, and are explained with reference to FIG. 5.

Figure 5:
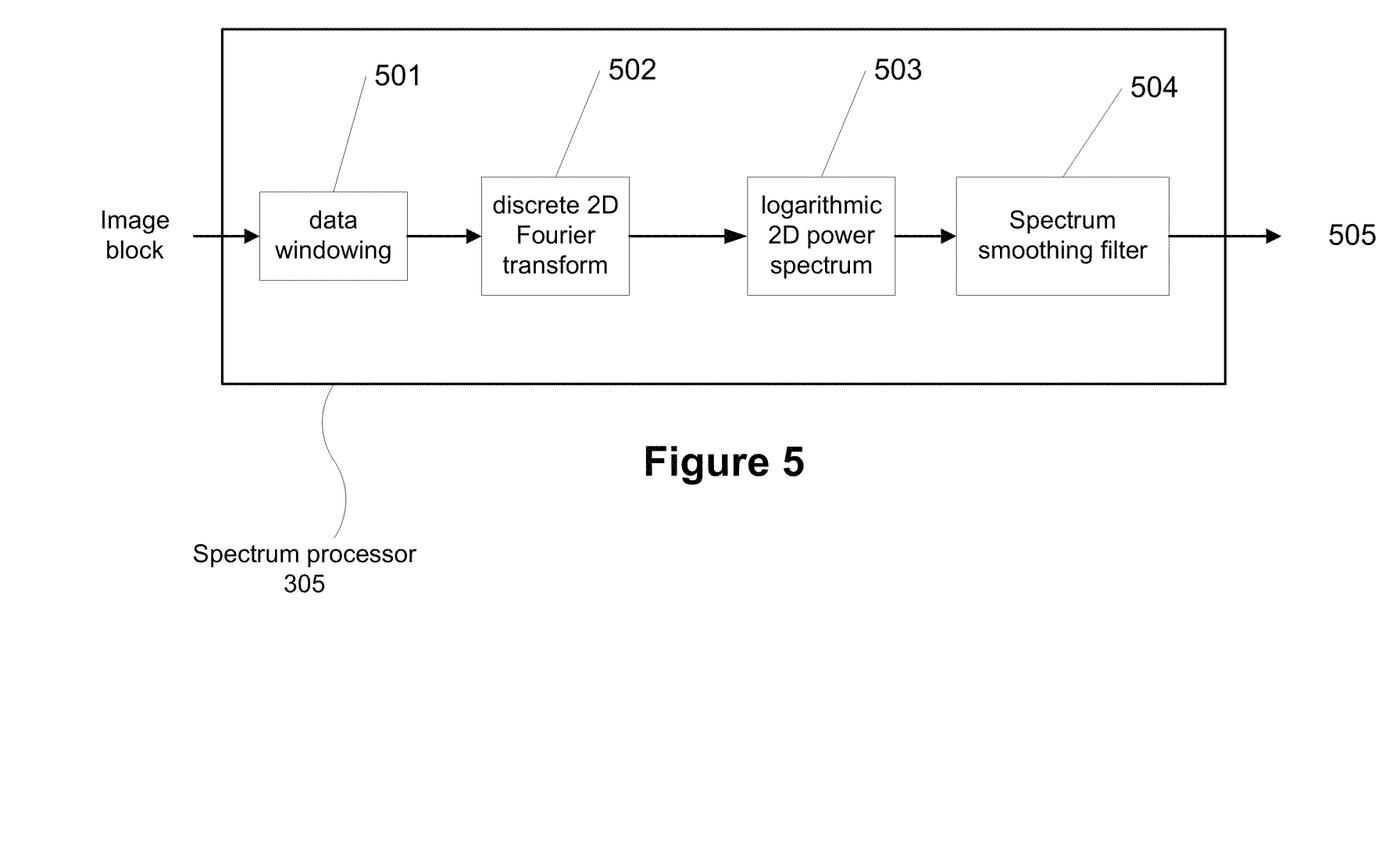
FIG. 5 shows a block diagram of a spectrum processor according to an example implementation.

FIG. 5 shows the operation of the spectrum processors 305, 306 and 307. Spectrum processor 305 takes each of the image blocks, applies a data windowing operation 501, and then performs a two-dimensional discrete Fourier transform 502 on the data. The Fourier transform 502 is then used to calculate the logarithmic power spectrum 503 of each of the image blocks, to which a spectrum smoothing filter 504 is applied.

In mathematical terms, the operation sequence illustrated in FIG. 5 is as follows. A luminance block $f_Q^{n,m}(x,y)$, from input image Q, is multiplied by a window function w(x,y), at 501 to generate windowed data, $g_Q^{n,m}(x,y) = f_Q^{n,m}(x,y) \times w(x,y)$. It will be appreciated by practitioners in the art, that data windowing is a means of reducing unwanted transform edge effects and also that the precise form of the data windowing function can take a variety of forms. At 502, the two-dimensional Fourier transform $F_Q^{n,m}(j,k)$ of the windowed data, defined at discrete frequencies j and k is calculated from the definition;

$$F_Q^{n,m}(j, k) = \sum_{x=0}^{N-1} \sum_{y=0}^{N-1} g_Q^{n,m}(x, y) \exp\left(i2\pi\left(\frac{xj}{N}\right)\right) \exp\left(i2\pi\frac{yk}{N}\right)$$

The Fourier transform result is used at 503 to calculate a two-dimensional power spectrum of the block. There are several definitions of the 'power spectrum'. Although other definitions may be used, here we use a definition which is simply the logarithmic magnitude of the Fourier transform:

$$P_Q^{n,m}(j,k) = 10 \log_{10}\{\Re^2[F_Q^{n,m}(j,k)] + \Im^2[F_Q^{n,m}(j,k)]\}$$

Here the symbols $\Re$ and $\Im$ represent the real and imaginary components of the Fourier transform respectively.

At 504, a smoothing filter is applied to the power spectrum. This spectrum smoothing function is used because of the discrete nature of real-world power spectra and that they are not absolutely shift-invariant. The smoothing helps mitigate against small residual motion dependence, consequences of discrete sampling, and transform edge effects. As previously mentioned, absolute invariance under spatial translation is a property of the magnitude component of the continuous Fourier transform of infinite signals in the presence of a single universal shift. In practice, using discrete transforms with finite transform limits, applying data windowing to mitigate transform edge effects, and faced with the common situation of multiple motions within typical video content, it is found that the power spectra are not strictly insensitive to motion—as a person skilled in the art will appreciate. But this filtering stage is merely a cautionary extra measure, included to enhance performance.

The filter may take a variety of forms but a suitable choice is a rectangular moving-average or box filter of aperture size (2M+1)×(2M+1), $$G_Q^{n,m}(j, k) = \frac{1}{(2M+1)^2} \sum_{p=-M}^{M} \sum_{q=-M}^{M} P_Q^{n,m}(j+p, k+q)$$

An appropriate choice for M with respect to 128×128 sized image blocks and spectra is 2 although other values can be adopted with similar overall effect.

The filtered power spectra are then presented to the output of the spectrum processor 505.

With reference back to FIG. 3, the modified power spectra $G_P^{n,m}(j,k)$, $G_I^{n,m}(j,k)$ and $G_N^{n,m}(j,k)$ of co-sited image blocks from previous (P), interpolated (I) and next (N) images, produced by the spectrum processors 305, 306 and 307 respectively, are each passed to two independent ratiometric measurement functions 308 and 312, which produce one result per frequency component of each block n,m and pass the results to ratiometric measurement processors 309 and 313 respectively.

Ratiometric measurement function 308 performs the operation, $$s_1^{n,m}(j, k) = \text{Max}\left[\left(-1 + \frac{2 \times G_I^{n,m}(j, k)}{\text{Max}[G_P^{n,m}(j, k) + G_N^{n,m}(j, k), \mu]}\right), 0\right]$$

where μ is a small constant that avoids division by zero. Function 308 returns values at or near zero when the modified power spectra component of the interpolated image block is similar to the average modified power spectra of the previous and next image block at the same frequencies, and otherwise returns values of increasing magnitude as the power spectra component of the interpolated image block exceeds the average power spectra component of the previous and next image block at the same frequencies. This means that it yields high values when additional power spectra components appear. Such increases are commonly as a consequence of edge artefacts in the interpolated image block. Although in this example the modified power spectra of the interpolated image block is compared to the average modified power spectra of the previous and next images, it has been found that alternatively the modified power spectra of the interpolated image block may be compared to only one of the modified power spectra of the previous and next images.

Ratiometric measurement function 312 performs the operation, $$r_2^{n,m}(j, k) = \frac{|G_P^{n,m}(j, k) - G_I^{n,m}(j, k)| + |G_N^{n,m}(j, k) - G_I^{n,m}(j, k)|}{\text{Max}[|G_P^{n,m}(j, k) - G_N^{n,m}(j, k)|, \mu]}$$

$$s_2^{n,m}(j, k) = \begin{array}{l} 0 \quad \text{if } r_2^{n,m}(j, k) < \tau \\ r_2^{n,m}(j, k) \quad \text{if } r_2^{n,m}(j, k) \geq \tau \end{array}$$

where μ is a small constant that avoids division by zero, and τ is a coring function threshold, which is present because it helps to reduce spurious small signal 'noise'.

Function 312 compares absolute power spectrum component differences. The function returns values at or near zero when the differences between the interpolated image block and each of the adjacent input image blocks are at or near zero, otherwise returns values of increasing magnitude as the differences between the interpolated image block and each of the adjacent input image blocks image blocks exceed the differences between the adjacent input image blocks themselves. This means that it yields high values when power spectra components are reduced—which commonly occurs when weighted blending is present.

For each block n,m processed, a plurality of scores $s_1^{n,m}(j, k)$ and $s_2^{n,m}(j,k)$ are generated by functions 308 and 312 respectively, which are passed to the ratiometric measurement processors 309 and 313 in FIG. 3.

Figure 6:
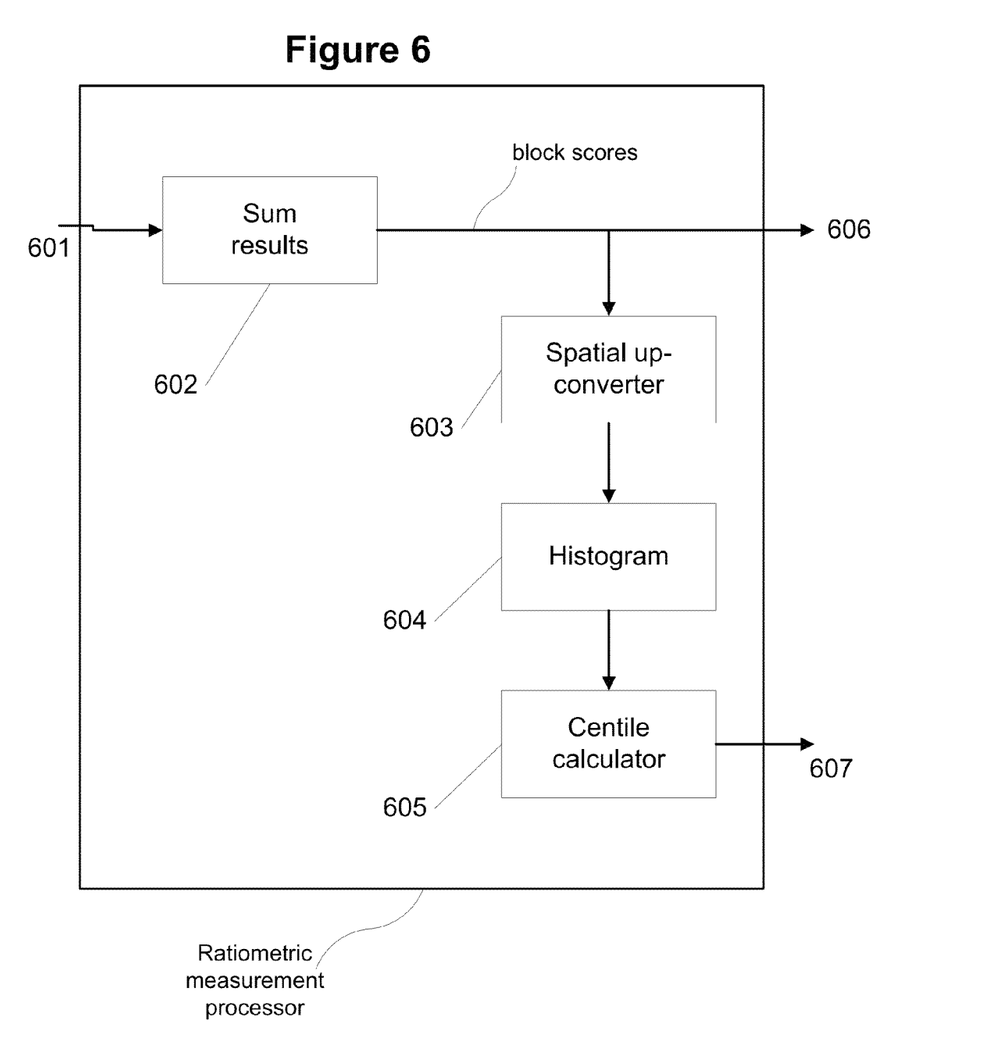
FIG. 6 shows a block diagram of a ratiometric measurement processor according to an example implementation.

FIG. 6 illustrates the operation of the ratiometric measurement processors (corresponding to 309 and 313 shown in FIG. 3. For each block n,m, a plurality of ratiometric scores is summed over the discrete frequencies j and k by the accumulator 602 to produce a result that is associated with the interpolation block n,m and these results form one aspect of the output 606 of the ratiometric measurement processor which represent a block-wise regional impairment score for the interpolated image. The block scores indicate—independently—the blocks in the interpolated image where interpolation errors have occurred, and form an output indication as to whether image impairments are present in each of the blocks. The scores may be compared to a threshold or predetermined score to determine whether the scores are indicative of image impairments in the image blocks.

The set of scores generated by the adder 602 for all blocks in the image is additionally distributed to a spatial interpolator 603 which treats each block score as a point sample estimate of the artefact level with respect to the block centre position, and spatially up-converts these to the input image resolution to obtain a value for each pixel that is associated with the region around the pixel and varies smoothly across the full image area. There are a range of interpolation algorithms that can be used to achieve this goal, and a suitable choice is the well-known bi-linear interpolator.

The spatial interpolator 603 thus processes the sets of block scores generated by adder 602, such that, for each pixel position, x,y, in the interpolated input image, a result $I^{bi}(x,y)$ is determined. These results are then binned according to the score at each pixel position, as in a histogram.

The binned pixel scores are then passed to a centile calculator 605 which identifies the bin position at which the cumulative occupancy of the histogram reaches 95%: $C_{95}$=max $(m \times W_{bin}-T,0)$ where m is defined by $$\sum_{n=0}^{m_1} H(n) \approx 0.95 \times \sum_{n=o}^{nmax} H(n).$$

where n is the histogram bin index, $W_{bin}$ is the histogram bin width, the ≈ sign indicates that the m is the bin index that most closely approximates the 95% of the full occupancy, and T is a small threshold that, combined with the max( ) function, eliminates small unwanted readings that are generally unreliable.

The centile score forms a second aspect of the output 607; which presents a single number score for the entire interpolated image.

With reference back to FIG. 3, a first instance, 309, of the ratiometric measurement processor delivers output 310 (corresponding to item 606 shown in FIG. 6) which comprises a block-wise regional impairment score for the interpolated image derived from the ratiometric scores $s_1^{n,m}(j,k)$, and reflecting the scores for rip and tear type artefact presence in the image blocks. Instance 309 delivers a second output 311 (corresponding to item 607 shown in FIG. 6), which comprises a single number score for the interpolated image derived from the ratiometric scores $s_1^{n,m}(j,k)$, reflecting the scores for rip and tear type artefact presence in the whole image.

A second instance, 313, of the ratiometric measurement processor delivers output 314 (corresponding to item 606 shown in FIG. 6) which comprises a block-wise regional impairment score for the interpolated image derived from the ratiometric scores $s_2^{n,m}(j,k)$, and reflecting the scores for blend type artefact presence in the image blocks. Instance 313 delivers a second output 315 (corresponding to item 607 shown in FIG. 5, which comprises a single number score for the interpolated image derived from the ratiometric scores $s_2^{n,m}(j,k)$, reflecting the scores for blend artefact presence in the whole image.

These scores indicate the likelihood of and the extent to which the different types of artefacts are likely to be present in each of the image blocks in the interpolated image and in the interpolated image as a whole. The scores may be compared to a threshold or predetermined score to determine whether the scores are indicative of image impairments present in the images, rather than differences caused merely by a change of content between the images.

The invention claimed is:

1. A computer-implemented method for detecting image impairments caused by interpolation in an image interpolated from two or more adjacent images thereto, each image comprising a plurality of pixels, the method comprising:

applying a substantially shift invariant image transform to the interpolated image and to at least one of the adjacent images to derive a transformed image representation for each image, each transformed image representation comprising a plurality of values which are substantially independent of the spatial position of the pixels in the image;

comparing corresponding ones of the values in the transformed image representations of the interpolated image and at least one of the adjacent images to produce comparison results;

summing the comparison results; and detecting differences between the transformed image representations indicative of image impairments in the interpolated image caused by interpolation from the summed comparison results.

2. A method according to claim 1, wherein the transformed image representations comprise power spectrums of the images.

3. A method according to claim 2, wherein the plurality of values in each representation comprise power or energy values at high and low frequency components.

4. A method according to claim 2, further comprising filtering the power spectrums, before comparing the power spectrums, to smooth variations therein.

5. A method according to claim 2, wherein the detecting step comprises detecting a change in one or more of power and energy at one or more frequency components in the interpolated image.

6. A method according to claim 1, wherein the substantially shift invariant image transform is applied to each of the adjacent images; and the comparing comprises comparing corresponding ones of the values in the transformed image representations of the interpolated image and each of the adjacent images.

7. A method according to claim 1, further comprising forming an indication of the extent to which image impairments are present for each of one or more image blocks in the interpolated image.

8. A method according to claim 1, further comprising using the indication of the extent to which image impairments are present for each of one or more of the image blocks of the interpolated image to derive an indication of the extent to which image impairments are present for the entire interpolated image.

9. A method according to claim 1, wherein the detecting step comprises comparing the sum of the results of the comparisons to a threshold to determine whether differences are indicative of image impairments caused by interpolation errors.

10. A method according to claim 1, wherein the comparing step comprises determining, for each of the values in the transformed image representation of the interpolated image, a ratio of the value in the transformed image representation of the interpolated image to the corresponding value in the transformed image representation of the at least one adjacent image; and summing the ratios.

11. A method according to claim 1, wherein each of the values in the transformed image representation of the interpolated image is compared to an average of the corresponding values in the transformed image representations of the adjacent images.

12. A tangible medium storing instructions for configuring a computer to perform a method for detecting image impairments caused by interpolation in an image interpolated from two or more adjacent images thereto, each image comprising a plurality of pixels, the method comprising:

applying a substantially shift invariant image transform to the interpolated image and to at least one of the adjacent images to derive a transformed image representation for each image, each transformed image representation comprising a plurality of values which are substantially independent of the spatial position of the pixels in the image;

comparing corresponding ones of the values in the transformed image representations of the interpolated image and at least one of the adjacent images to produce comparison results;

summing the comparison results; and detecting differences between the transformed image representations indicative of image impairments in the interpolated image caused by interpolation from the summed comparison results.

13. An apparatus for detecting image impairments caused by interpolation in an image interpolated from two or more adjacent images thereto, each image comprising a plurality of pixels, comprising:

an image transformer for applying a substantially shift invariant image transform to the interpolated image and to at least one of the adjacent images to derive a transformed image representation for each image, each transformed image representation comprising a plurality of values which are substantially independent of the spatial position of the pixels in the image;

a comparator for comparing corresponding ones of the values in the transformed image representations of the interpolated image and at least one of the adjacent images;

a summer for summing the results of the comparisons; and a detector of differences between the transformed image representations indicative of image impairments in the interpolated image caused by interpolation from the sum of the results of the comparisons.

14. An apparatus according to claim 13, wherein the transformed image representations comprise power spectrums of the images.

15. An apparatus according to claim 13, wherein the plurality of values in each transformed image representation comprise power or energy values at high or low frequency components.

16. An apparatus according to claim 15, wherein the substantially shift invariant image transform is applied to each of the adjacent images; and the comparator is operable for comparing for comparing corresponding ones of the values in the transformed image representations of the interpolated image and each of the adjacent images.

17. An apparatus according to claim 16, further comprising an image divider for dividing the interpolated image and one or more of the adjacent images into respective pluralities of image blocks comprising a plurality of pixels, wherein the image transformer is configured for applying a substantially shift invariant image transform to each of one or more of the image blocks in each of the interpolated and adjacent images to derive a transformed image representation comprising a plurality of values which are substantially independent of the spatial position of the pixels in the image for each of the one or more image blocks; and the comparator is operable for comparing corresponding ones of the values in the transformed image representations of spatially corresponding image blocks in the interpolated and adjacent images.

18. An apparatus according to claim 17, further comprising an impairment characterization module for forming an indication of the extent to which image impairments are present for each of one or more image blocks in the interpolated image.

19. An apparatus according to claim 18, further comprising an image impairment module for using indications of the extent to which image impairments are present for each of one or more of the image blocks of the interpolated image to derive an indication of the extent to which image impairments are present for the entire interpolated image.

20. An apparatus according to claim 16, wherein the detector comprises a comparator for comparing the sum of the results of the comparisons to a threshold to determine whether the differences are indicative of image impairments caused by interpolation errors.

21. An apparatus according to claim 16, further comprising a filter for filtering the power spectrums, before the power spectrums are compared, to smooth variations therein.

22. An apparatus according to claim 16, wherein the detector is operable to detect a change in one or more of power or energy at one or more frequency components in the interpolated image.

23. An apparatus according to claim 16, wherein the comparator is operable for determining, for each value in the transformed image representation of the interpolated image, a ratio of each of the values in the transformed image representation of the interpolated image to the corresponding value in the transformed image representation of the at least one adjacent image; and for summing the ratios.

24. An apparatus according to claim 16, wherein each of the values in the transformed image representation of the interpolated image is compared to an average of the corresponding values in the adjacent images.

25. Apparatus according to claim 16, wherein the comparator is configured for determining, for each value in the transformed image representation of the interpolated image, a ratio of the sum of the magnitudes of the differences between the value in the transformed image representation of the interpolated image and the corresponding value in each of the transformed image representations of the adjacent images, to the magnitude of the difference between the corresponding values in the transformed image representations of the adjacent images; and for summing the ratios.

* * * * *